(No Model.)

J. H. WESSON.
REVOLVER.

No. 565,246. Patented Aug. 4, 1896.

Witnesses:
J. W. Garfield
A. J. Clemore

Inventor,
Joseph H. Wesson,
by Chapin & Co.
Attorneys.

UNITED STATES PATENT OFFICE.

JOSEPH H. WESSON, OF SPRINGFIELD, MASSACHUSETTS.

REVOLVER.

SPECIFICATION forming part of Letters Patent No. 565,246, dated August 4, 1896.

Application filed January 20, 1896. Serial No. 576,090. (No model.)

*To all whom it may concern:*

Be it known that I, JOSEPH H. WESSON, a citizen of the United States, residing at Springfield, in the county of Hampden and State of Massachusetts, have invented new and useful Improvements in Revolvers, of which the following is a specification.

This invention relates to revolvers, and particularly to that class made with solid frames in which the cylinder is swung out from the frame to be reloaded; and it consists, essentially, in improved means for securing the cylinder on the cylinder-pin, all as hereinafter fully described, and more particularly pointed out in the claims, the object of this invention being to do away with certain inconveniences in the manipulation of the arm and certain expensive processes in the construction thereof, all as hereinafter more fully specified.

Figure 1:
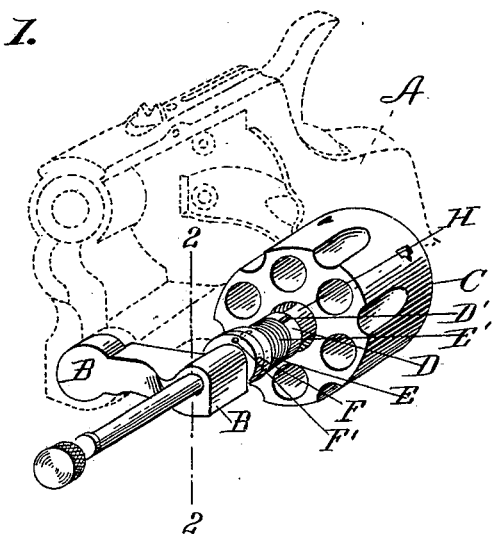
Figure 2:
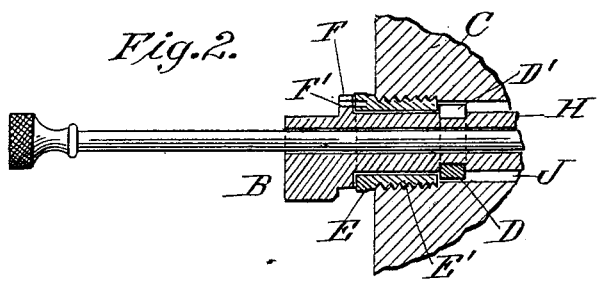
Figure 3:
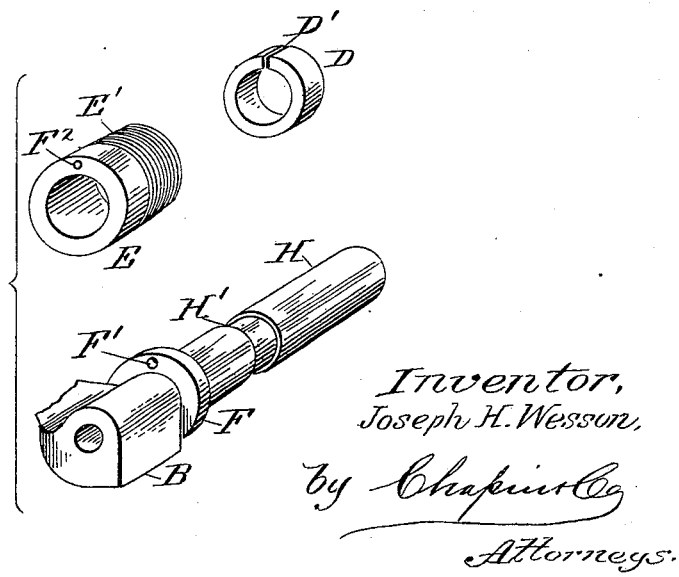

In the drawings forming part of this specification, Figure 1 is a perspective view of a portion of a revolver, showing the cylinder-supporting arm and the cylinder swung out of the frame, portions of the frame being indicated in dotted lines. Fig. 2 is a longitudinal section through a portion of the cylinder, a portion of the cylinder-arm, and of the devices for securing the cylinder on its pin. Fig. 3 shows in perspective the cylinder-pin and the several devices securing the cylinder thereto, the parts shown in Figs. 2 and 3 being considerably enlarged.

In the drawings, A is the frame of the revolver shown in dotted lines and having pivoted therein, in the usual manner, the cylinder-arm B, carrying the cylinder-pin H. Said cylinder-pin is integral with or rigidly fixed on said arm B, and a shoulder F is provided at the base of said pin H, where it joins the arm B. On said pin H is formed an annular groove H', which in practice is of very slight depth. A sleeve E is fitted to rotate freely on said cylinder-pin H between said annular groove and the shoulder F of the cylinder-pin. Said sleeve E is secured in operative position on the cylinder-pin by a spring-collar D, which is cut or broken at D', thus forming a broken ring whose interior diameter equals the diameter of the cylinder-pin within the annular groove H' and which is forced over the end of said pin into the groove H', wherein its spring action retains it and whereby it prevents the sleeve E from being withdrawn from the pin H, while it permits the free rotation of said sleeve thereon. Said collar is, in practice, of such thickness that it is conveniently sprung open sufficiently to retire it from the groove H' and remove it from the cylinder-pin. The end of said sleeve adjoining said collar D is threaded at E', Figs. 1, 2, and 3, for more or less of its length, and the central hole through the cylinder C is similarly threaded in the forward end thereof, to the end that said cylinder may be screwed onto said sleeve and thus be retained thereby on the cylinder-pin. In the end of sleeve E is provided a hole $F^2$, and through the shoulder F is a similar hole F'. When said holes F' and $F^2$ are brought into line with each other, any convenient pin or implement is passed through the hole F' in the shoulder F and into the hole $F^2$ in the sleeve E and serves to hold the said sleeve from turning on the cylinder-pin, and when so held the cylinder C may be either screwed onto or off from said sleeve.

The coinciding holes F' and $F^2$ are shown as one of many means which may be employed for holding the sleeve E against rotation while the cylinder is being unscrewed therefrom or screwed thereon. For instance, the end of the sleeve next to the shoulder F may be faced off so that a wrench can be applied thereto, whereby it can be held from turning fully as well as by interlocking the parts, as described above.

By the use of the above-described improved means for holding the cylinder on its pin when swung out of the frame, providing any projection on the outer surface of the frame of the arm, as heretofore practiced, for engaging the cylinder when swung out of the frame, as aforesaid, for ejecting cartridge-shells, is obviated and the finishing of the said outer surface of the frame is rendered convenient and inexpensive.

In providing for the proper construction and operation of said spring-collar D, within the cylinder C, the latter has a cylinder-pin passage therein adjoining said collar of somewhat greater diameter than said pin, whereby an annular chamber J is formed, which constitutes a clear space within the central portion of said pin-passage, which serves to reduce the frictional contact of cylinder and pin and conduces to the free revolution of the latter. Furthermore, the operation of the extractor is easier with the cylinder held at its front end and at a point in line with the movement of the extractor-rod, especially when from long use the parts are worn.

Having thus described my invention, what I claim, and desire to secure by Letters Patent, is—

1. In a revolver of the class described, the cylinder-pin having a shoulder thereon at one end, and an annular groove near said shoulder, the cylinder having one extremity of its cylinder-pin passage screw-threaded, a loosely-turning sleeve carried on said pin near said shoulder having a screw engagement with said cylinder, a collar on said pin at one end of said sleeve engaging in said annular groove, and means for temporarily holding said sleeve against rotation on said pin, combined and operating substantially as set forth.

2. In a revolver of the class described, the cylinder-supporting arm having the cylinder-pin connected thereto, a groove in said cylinder-pin, a removable collar resting in said groove, and the cylinder having a sleeve at its front end, and surrounding the cylinder-pin in front of said collar, all combined substantially as described.

3. In a revolver of the class described, the cylinder-supporting arm carrying the rigid cylinder-pin, the cylinder having an internal sleeve connected thereto by screw-thread and surrounding the cylinder-pin, and means for locking said sleeve relatively to the cylinder-pin, so that the cylinder may be removed from the sleeve by turning the cylinder, all combined substantially as described.

JOSEPH H. WESSON.

Witnesses:
  H. A. CHAPIN,
  K. I. CLEMONS.